United States Patent [19]

Lawrie et al.

[11] 4,051,551

[45] Sept. 27, 1977

[54] MULTIDIMENSIONAL PARALLEL ACCESS COMPUTER MEMORY SYSTEM

[75] Inventors: Duncan H. Lawrie, Champaign, Ill.; Chandrakant Ratilal Vora, Audubon, Pa.

[73] Assignee: Burroughs Corporation, Detroit, Mich.

[21] Appl. No.: 682,526

[22] Filed: May 3, 1976

[51] Int. Cl.$^2$ .................... G06F 15/16; G06F 15/32
[52] U.S. Cl. .................................................. 364/200
[58] Field of Search .................. 340/172.5; 445/1; 364/200

[56] References Cited

U.S. PATENT DOCUMENTS

| 3,274,561 | 9/1966 | Hallman et al. | 340/172.5 |
| 3,349,375 | 10/1967 | Seeber et al. | 340/172.5 |
| 3,787,818 | 1/1974 | Arnold et al. | 340/172.5 |

*Primary Examiner*—Harvey E. Springborn
*Attorney, Agent, or Firm*—Edward J. Feeney, Jr.; Edmund M. Chung; Leonard C. Brenner

[57] ABSTRACT

A multidimensional parallel access computer memory system is provided to facilitate high speed parallel access of data from a multi-bank computer memory. The system is particularly adapted to matrix calculations whereby matrix elements along linear matrix vectors are nonconflictingly stored in a plurality of independent memories and are associated in parallel with a plurality of independent processors for high speed matrix manipulations. An alignment network interposing the plurality of memories and the plurality of processors responds to the generation of memory and address tags to associate a particular matrix element stored in a particular memory address with a particular processor for processing.

6 Claims, 9 Drawing Figures

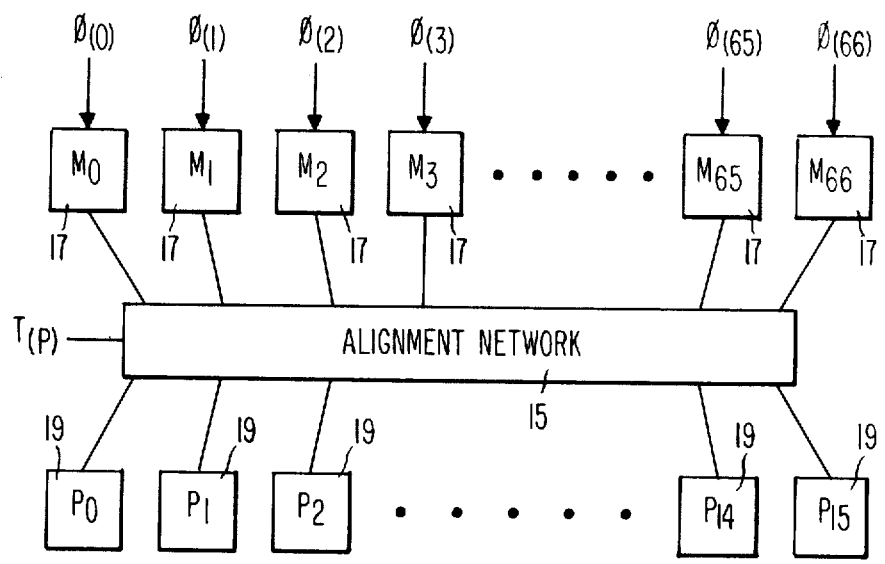
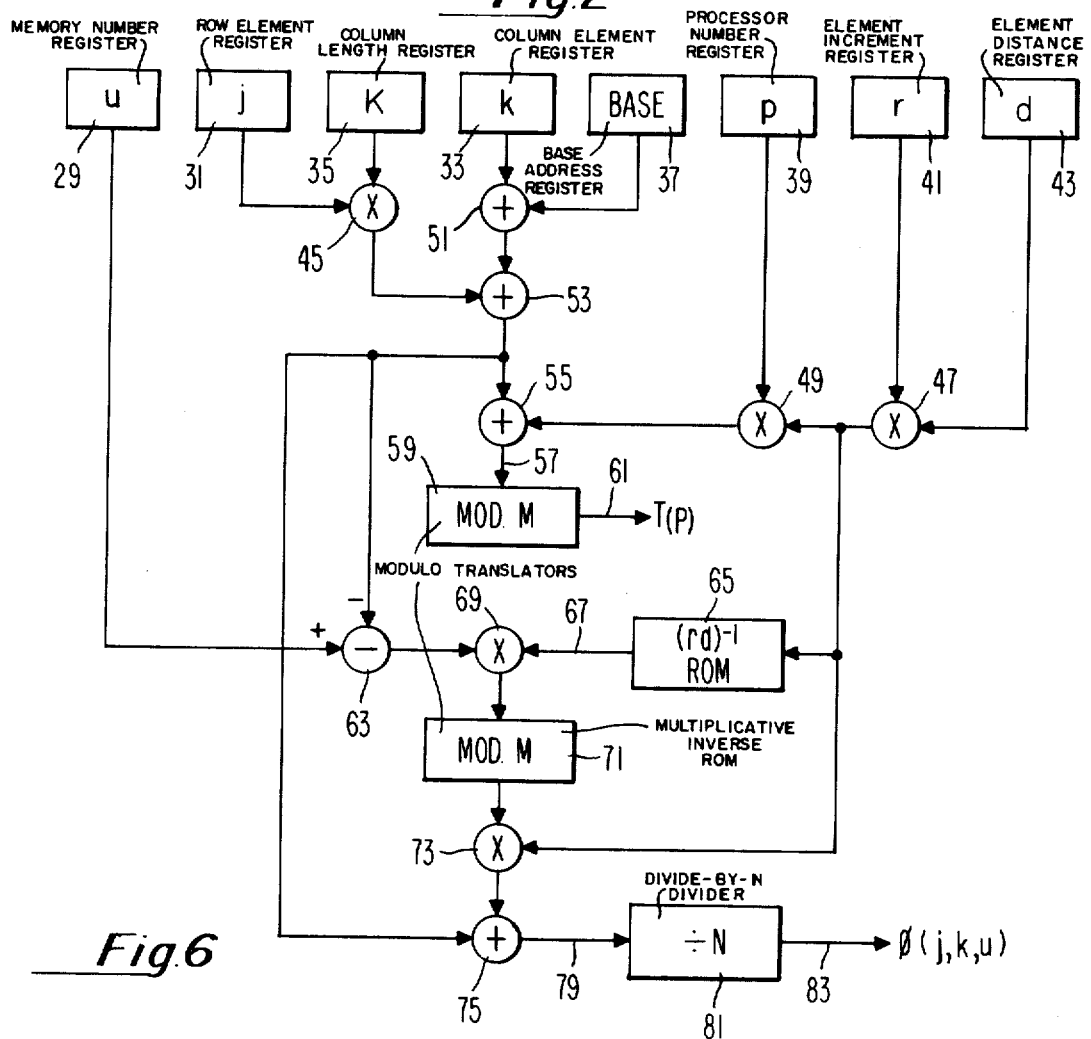

Fig. 4

| | 0 | 1 | 2 | 3 | 4 | |
|---|---|---|---|---|---|---|
| 0 | 0 | 1 | 2 | 3 | – | BASE NUMBERS |
| 1 | 5 | 6 | 7 | – | 4 | |
| 2 | 0,1 | 0,2 | – | 8 | 0,0 | |
| 3 | 0,6 | – | 0,3 | 0,4 | 0,5 | |
| 4 | – | 1,0 | 1,1 | 1,2 | 1,3 | |
| 5 | 1,4 | 1,5 | 1,6 | 2,0 | – | |
| 6 | 2,2 | 2,3 | 2,4 | – | 2,1 | |
| 7 | 3,0 | 3,1 | – | 2,5 | 2,6 | |
| 8 | 3,5 | – | 3,2 | 3,3 | 3,4 | STORED MATRIX |
| 9 | – | 3,6 | 4,0 | 4,1 | 4,2 | |
| 10 | 4,3 | 4,4 | 4,5 | 4,6 | – | |
| 11 | 5,1 | 5,2 | 5,3 | – | 5,0 | |
| 12 | 5,6 | 6,0 | – | 5,4 | 5,5 | |
| 13 | 6,4 | – | 6,1 | 6,2 | 6,3 | |
| 14 | – | 6,5 | 6,6 | 7,0 | 7,1 | |
| 15 | 7,2 | 7,3 | 7,4 | 7,5 | – | |
| 16 | 65 | 66 | 67 | – | 7,6 | |
| 17 | 70 | 71 | – | 68 | 69 | |
| 18 | 75 | – | 72 | 73 | 74 | BASE NUMBERS |
| 19 | – | 76 | 77 | 78 | 79 | |
| 20 | 80 | 81 | 82 | 83 | – | |

Memory Number (top header); Memory Address (Ø) (left header)

MULTIDIMENSIONAL PARALLEL ACCESS COMPUTER MEMORY SYSTEM

CROSS REFERENCES TO RELATED APPLICATIONS

In copending application Ser. No. 576,002 now U.S. Pat. No. 3,980,874, for "Binary to Modulo M Translation" filed May 9, 1975, in the name of C. R. Vora and assigned to the assignee of the present invention there is described and claimed a method and apparatus for translating binary numbers into modulo M numbers. Although not limited thereto, the present invention employs in its preferred embodiment such a method and apparatus.

BACKGROUND OF THE DISCLOSURE

As speed requirements of computer processing units have increased, systems employing greater numbers of parallel memory modules have been developed. One such system, Illiac IV, has in the order of 64 parallel memories, see U.S. Pat. No. 3,537,074, issued Oct. 27, 1970 to R. A. Stokes et al., and assigned to the assignee of the present invention.

Parallel memory systems generally suffer however from unavoidable memory conflicts. Severe storage problems frequently arise in performing matrix computations. Consider for example, a typical two-dimensional matrix having its elements stored column-by-column in a parallel memory array. Under such a storage system, row, forward diagonal and reverse diagonal elements may be accessed in parallel. However, column elements must be accessed serially out of each memory. Thus a memory conflict arises which limits the processing capability of the parallel memory system.

Other storage systems permit parallel access to a matrix column but may cause a conflict for row, diagonal or other matrix vector access. The conflict problem has been studied, see Budnik and Kuck, "The Organization and Use of Parallel Memories", IEEE TRANSACTIONS ON COMPUTERS, December 1971, pages 1566–1569, and "Access and Alignment of Data in an Array Processor", D. H. Lawrie, IEEE TRANSACTIONS ON COMPUTERS, December 1975. However, attempts to solve the conflict problem generally lead to a relatively complex memory storage system and tend to increase the complexity of aligning the plurality of parallel memories with the associated plurality of arithmetic units or processors.

OBJECTS AND SUMMARY OF THE INVENTION

It is therefore an object of the present invention to provide non-conflicting linear vector storage of a multi-dimensional matrix in a parallel memory computer system.

It is also an object of the present invention to provide a relatively simple storage system minimizing routing complexities between the parallel memories and the associated plurality of arithmetic units or processors.

It is a still further object of the invention to provide a complete non-conflicting linear vector storage system permitting parallel access not only to rows, columns, and major diagonals of a matrix but also to all other linear matrix vectors and to non-unity incremental elements along the linear vectors.

In carrying out these and other objects of this invention a matrix storage system is provided having an alignment network interposing a plurality of memory modules and a plurality of processors in response to generated memory selection and memory address tags, the alignment network associates a particular address of a particular memory with a particular processor to permit data communications therebetween. By non-conflictingly storing the elements of all linear vectors of a matrix in the plurality of memory modules, all elements of any linear vector of the matrix are accessible for processing in a high speed parallel operation.

The system configuration and operational details given above have been presented in simplified form. The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 2 is a block diagram of a parallel memory data processing system employing memory alignment and address tags generated by the present invention;

FIG. 4 represents a two-dimensional matrix non-conflictingly storable in the parallel memory computer system of FIG. 3;

FIG. 5 illustrates the matrix of FIG. 4 non-conflictingly stored in the system of FIG. 3;

FIG. 6 is a diagram of a hardware implementation for generating two indexing tags used to access the stored matrix of FIG. 5;

Figures 7, 8:
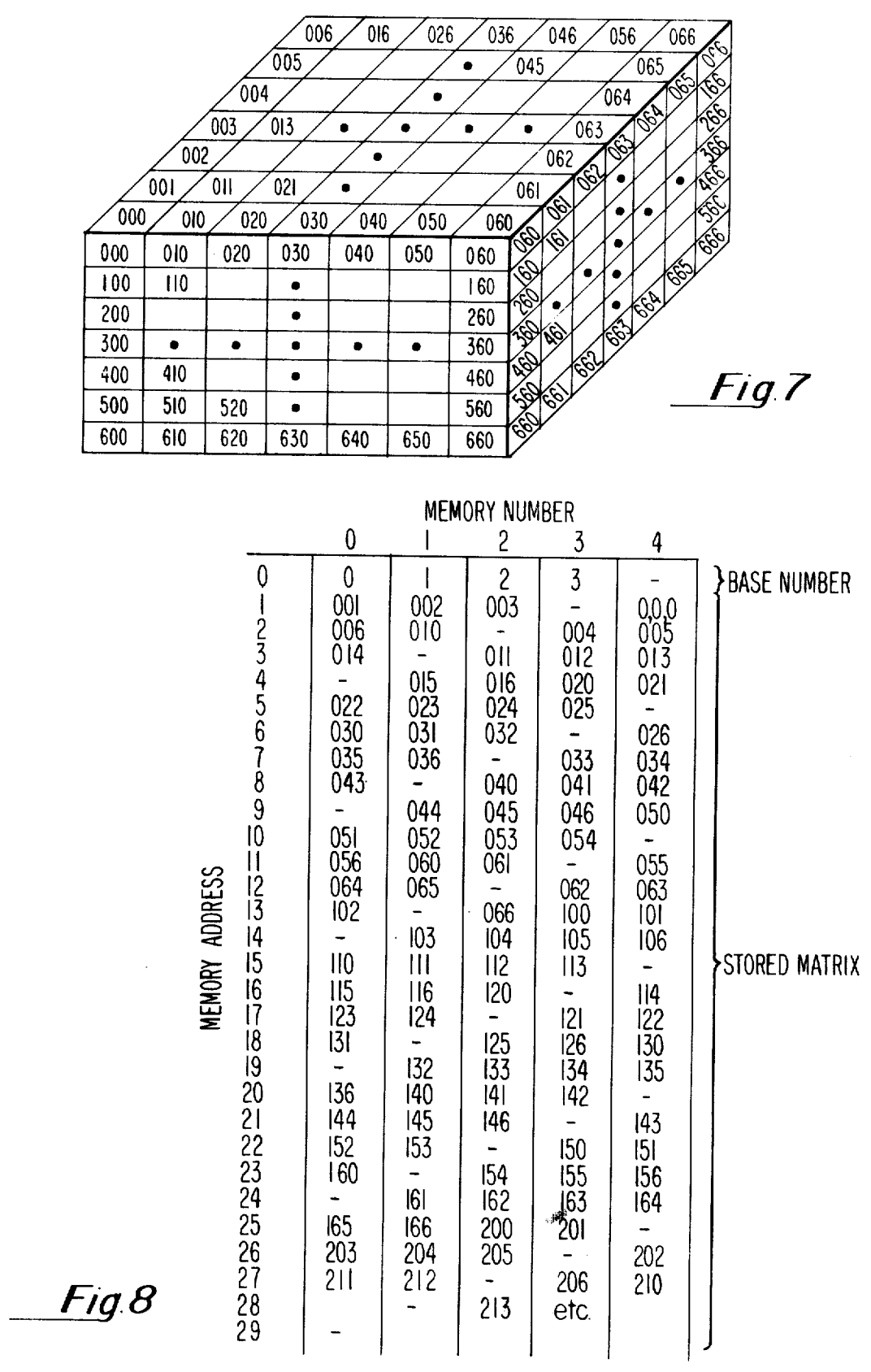

FIG. 7 represents a three-dimensional matrix non-conflictingly storable in the parallel memory data processing system of FIG. 3;

FIG. 8 illustrates the matrix of FIG. 7 non-conflictingly stored in the system of FIG. 3.

DESCRIPTION OF THE PREFERRED EMBODIMENT

Figure 1:
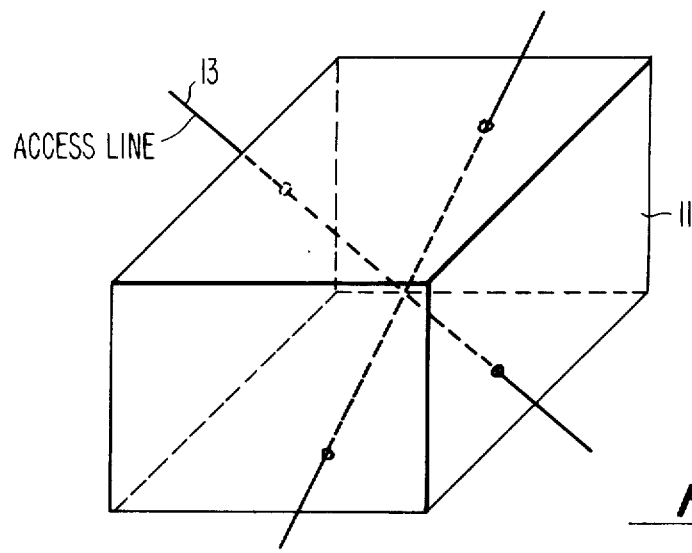
FIG. 1 is an illustration depicting a multidimensional matrix having linear access vectors, each vector thereof capable of being accessed in parallel by the present invention.

The capability of the present invention may be understood by considering a multidimensional matrix 11 pierced by a linear vector 13, see FIG. 1. The invention provides a method and apparatus for accessing in parallel all matrix elements along the vector 13. More particularly, the invention provides a method and apparatus for non-conflictingly storing the elements of all linear vectors of a multidimensional matrix in a parallel memory computer system to permit parallel processing of the elements along any linear vector.

The parallel processing system of the instant invention, see FIG. 2, includes an alignment network 15 interposing a plurality of memories 17 and a plurality of processing units 19. More particularly, the network properly associates particular matrix elements stored in the plurality of memories with particular processing units. As may be appreciated, the elements of a multidimensional matrix must be mapped into the plurality of memories 17 according to an orderly storage arrangement.

The storage apparatus of the present invention, detailed hereinafter, generates two indexing tags, T(p) and φ(m). Tag T(p) aligns a particular memory 17 with a particular processor 19. Tag φ(m) addresses memory 17. In combination, indexing tags T(p) and φ(m) associate the data (for example, a matrix element binary representation) stored at a particular memory 17 address with a particular processor 19. In operation, indexing tags are generated at two different time frames and are denoted as pull tags and push tags. Pull tags are generated to "pull" data from a memory 17 address to a processor 19 for processing. Following processing (i.e., addition, multiplication, etc.) push tags are generated to return the processed data to a particular memory 17 address.

Preferably, the plurality of memories 17 are fashioned from high-speed addressable storage devices such as RAM's. The design of RAMs and other high-speed addressable storage devices is well known in the art. Many RAMs are commercially available in single-chip form and the employment of same in digital circuitry has become routine and is well within the capability of any person skilled in the art of digital logic design. The selection or design of a particular memory 17 is applications oriented relating to the size of the matrix that must be stored, and the desired speed of calculations and therefore involves the traditional size/speed/cost trade-off considerations. Preferably, a high speed device is employed; however, the invention is not so limited and may be used with slower secondary storage devices such as magnetic tape units and magnetic discs.

Likewise, the actual physical implementation of each processor 19 is applications oriented. The processor 19 may be implemented as a simple standard off-the-shelf adder for applications involving merely simple matrix addition. For more complex applications, each processor 19 may be fashioned from standard arithmetic units of the type commonly employed in small electronic four function calculators. Finally, for extremely complex processing of the data stored in the plurality of memories 17, each processor 19 may be a microprocessor of the type commercially available in LSI on a single chip. A suitable microprocessor for computer data processing is described in U.S. Pat. No. 3,878,514, issued Apr. 15, 1975, to Ulbe Faber and assigned to the assignee of the present invention.

The present invention places some constraints on the number of processors 19 and the number of memories 17. First, although not a true constraint in the absolute sense, the number of processors 19 should be a power of two. As detailed hereinafter, certain calculations of tags involve division by the number of processors 19 employed. Since division by a power of two may be accomplished by a mere shifting or masking operation and division by other numbers is quite laborious, the requirement that the number of processors be a power of two is quite important from the point of practical implementaion of the information.

The second, and in this case an absolute constraint, is that the number of memories 17 be relatively prime to the memory ordering of any vector 13 which is to be accessed from the memories 17. The memory ordering of any vector 13 is equal to that quantity represented by the distance ($d$) between two consecutive elements of the vector 13 times the increment ($r$) which is to be accessed. For example, if every element of the vector 13 is to be accessed then $r = 1$; whereas, if every other element is to be accessed then $r = 2$. To most readily assure satisfaction of the second constraint in the preferred embodiment of the invention, the number of memories 17 is set equal to a prime number.

Under current technological conditions, the operating speed of processors is quite often about twice that of memory systems. Optimization under such conditions is achieved by choosing the number of memories 17 as a prime number slightly greater than four times the number of processors. For example, an optimized fairly complex system comprises 16 processors 19 and 67 memories 17, see FIG. 2. Alternatively, for a less complex system arrangement the number of memories 17 may be a prime number slightly greater than the number of processors 19. As an example, four processors 19 and five memories 17 may be employed, see FIG. 3.

Figure 3:
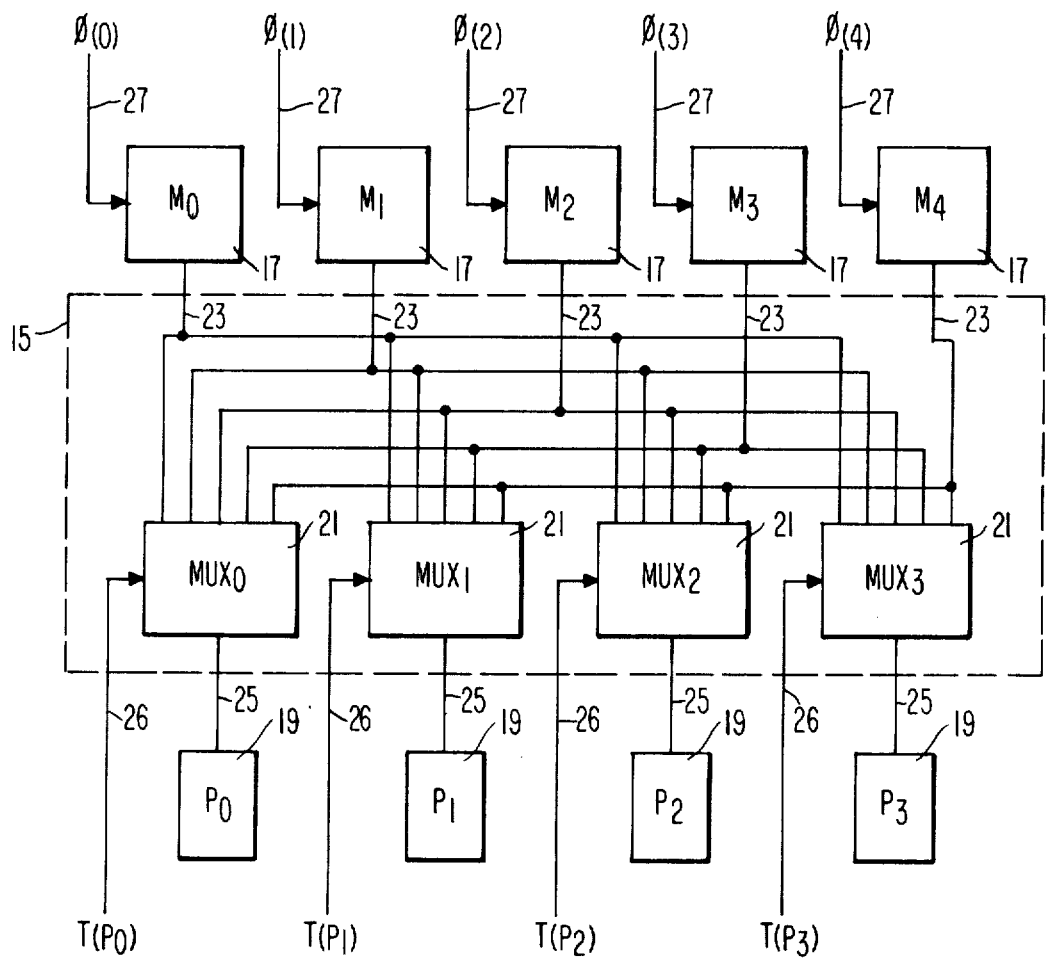
FIG. 3 is a detailed block diagram of the type of parallel memory computer system shown in FIG. 2.

With continued reference to FIG. 3, an alignment network 15 interposes the plurality of memories 17 and the plurality of processors 19. The function of the alignment network 15 is to associate a particular processor 19 with a particular memory 17 to permit the transfer of data therebetween. The alignment network 15 comprises a plurality of multiplexers 21, one multiplexer 21 individually associated with each processor 19. Each multiplexer 21 is connected to its associated processor 19 through a second data path 25. Each second data path 25 is connected to a selected first data path 23 in response to the particular memory tag T(p) present at a control input 26 associated with each multiplexer 21.

For visualization purposes, each multiplexer 21 may be thought of as a single-pole multi-throw switch controlled by the memory tag T(p) presented at the control input 26. However, as a single-pole switch, data transfer through the multiplexer 21 would have to be serial. Data flow may be increased by extending the single-pole concept to eight-pole thereby permitting serial-by-byte data flow. Preferably, for maximum speed, the multiplexer 21 is sufficient in size to permit parallel data transfer. Thus, a 24-pole-multi-throw switch with the number of throw positions being equal to the number of memories 17 employed in a given system configuration would permit parallel transfer of 24 bits of data.

Solid state multiplexers are well known in the art and are generally available in LSI form. One such multiplexer, the Motorola 8-Line Multiplexer MC 10164 has been used in a working model of the invention. For a large system having 67 memories 17, a number of MC 10164 units are paralleled to form a single multiplexer 21.

Each processor 19 and memory 17 has associated therewith as required data buffering (not shown) to interface with data flow through the multiplexers 21 and to permit orderly processing and storage of data. The need for buffering and the implementation thereof is well known to the art. It is further appreciated that the buffering requirements are reduced for parallel data transfer visa-vise serial data transfer.

In conjunction with the generation of the memory tags T(p) generated for the alignment network 15, a memory address tag φ(m) is generated and applied to the memory address control input 26 of each memory 17 to allow the data within a particular memory 17 address to be read out of the memory 17 into a processor 19 and to allow processed data to be read into a particular memory 17 address from a processor 19.

The memory tags T(p) and the memory address tags φ(m) are generated in accord with a particular storage arrangement of matrix elements. The storage arrangement and associated hardware will be discused first with regard to the storage of a two-dimensional matrix.

Then the storage of a three-dimensional matrix will be considered. Finally, the extension of the storage arrangement to the storage of a multidimensional matrix will be explained.

In a two dimensional array, the two primary storage indexing equations are:

1. a. $\phi(j,k,u) = [j \cdot K + k + base + r.d.x] \div N$ b. $x = [(rd)^{-1} u - (rd)^{-1} (j \cdot K + k + base)] \bmod M$ 2. $u = T(p) = [(j \cdot K + k + base + rdp)] \bmod M$ where:

$j,k$ = starting element of M-vector.
$r$ = increment
$u$ = memory number
$K$ = length of row
$M$ = number of memories
$N$ = the number representing the greatest power of two less than M
$T(p)$ = memory tag for processor
$base$ = number of array mapping start address
$d$ = distance between two consecutive elements of a M-vector
$(rd)^{-1}$ = the multiplicative inverse mod M of rd For example:
$d = 1$ for row
$d = K$ for column
$d = K + 1$ for forward diagonal
$d = K - 1$ for reverse diagonal It is clear from the above that the memory ordering (r.d) of any vector 13 which is to be accessed from the memories 17 must not be a multiple of M (else $rd_m = 0$ and $d^{-1}$ does not exist thereby indicating a conflicting storage of elements).

Several examples will be presented to aid in understanding the implementation of the indexing equations. All examples will assume a five memory 17 and a four processor 19 system, see FIG. 3. Also, all examples will assume a standard format 7 × 8 two-dimensional matrix, see FIG. 4, mapped into the memory system starting at base 9, see FIG. 5. Following the examples, a description of the logic hardware required for realizing the equations will be detailed.

The indexing equations have been developed for a zero origin system having its first memory 17 numbered zero and the first memory 17 address numbered zero, see FIG. 5. It is noted that the indexing equations may be readily modified to accommodate other than zero origin systems.

The base number as employed in the indexing equations refers to the first memory 17 location where the matrix is mapped into the memory system, see FIG. 5 for a matrix starting at base 9. With continued reference to FIG. 5, it can be seen that base 0 occurs logically enough at memory M0, address 0; base 2 at memory M3, address 0; and base 3 at memory M3, address 0.

However, memory M4 address 0 is not used for storing matrix elements as indicated by a dash (-). Base 4 occurs at memory 4 address 1. It can be seen that a diagonal of memory 17 addresses are not used as indicated by dashes along a line extending from memory M4 address 0 to memory M0 address 4. It can further be seen that a repetitive pattern develops as indicated by diagonal memory M4 address 5 to memory M0 address 9 and other diagonals shown in FIG. 5 by dashes. Such diagonals are not used in the base numbering scheme and are not used for storing non-conflicting matrix elements. However, the diagonals do represent actual memory addresses which may be used to store other data.

The storage pattern indicated in FIG. 5 is followed for all system configurations. For example, in the 16 processor 19, 67 memory 17 system, see FIG. 2, a diagonal of memory addresses not assigned base numbers extends from memory M66 address 0 down to memory M0 address 66. Other diagonals are fashioned in a repetitive fashion as indicated in FIG. 5.

The matrix elements are mapped into the memory system row-by-row. FIG. 5 illustrates the mapping of the matrix of FIG. 4 into memory starting with matrix element 0,0 at base 9 and ending with matrix element 7,6 at base 64.

With the matrix of FIG. 4 mapped into memory as shown in FIG. 5, several examples will illustrate fetching for various M vectors.

EXAMPLE 1:

Desired M vector = 2nd column, with starting element (1,2).
$r$ = Increment = unity
$K$ = 7

Calculation:
$K = 7, j = 1, k = 2; M = 5, N = 4, r = 1, base = 9$
$d = K$ for column
$\therefore rd = 1.7 = 7 \quad (rd)^{-1} = 3 \quad \therefore (rd)(rd)_5^{-1} = 7.3_5 = 21_5 = 1$
$j \cdot K + k + base = 1.7 + 2 + 9 = 18$
$x = [(rd)^{-1} u - (rd)^{-1} (jK + k + base)] \bmod M$
$= [3u - 3.18]_5 = (3u + 1)_5$
$\phi(j,k,u) = [j \cdot K + k + base + rdx] \div N$
$\phi(j,k,u) = [18 + 7(3u + 1)_5] \div )^4$
$T(p) = [j.2 + k + base + rdp] \bmod M$
$= [18 + 7p]_5$
$T(p) = [(2p + 3)]_5$

| Memory Number | Memory Address | Memory Matrix Contents | Processor Number | Memory Alignment | Processor Aligned Contents |
|---|---|---|---|---|---|
| u | $\phi(j.k.u.)$ | | p | T(p) | |
| 0 | 6 | 2,2 | 0 | 3 | 1,2 |
| 1 | 11 | 5,2 | 1 | 0 | 2,2 |
| 2 | 8 | 3,2 | 2 | 2 | 3,2 |
| 3 | 4 | 1,2 | 3 | 4 | 4,2 |
| 4 | 9 | 4,2 | | | |

As shown, the correct memory 17 addresses are produced and the alignment network 21 correctly aligns the first four elements of the column with the four processors 19.

EXAMPLE 2:

Desired M vector = 3rd row with starting element (3,0).
Increment = 2

Calculation
$K = 7, j = 3, k = 0, r = 2, base = 9$
$d = 1$ for row
$\therefore r.d = 2.1 = 2 \quad (rd)^{-1} = 3 \quad \therefore (rd) \cdot (rd)_5^{-1} = 2.3_5 = 1$
$j \cdot K + k + base = 3.7 + 0 + 9 = 30$
$x = [(rd)^{-1} u - (rd)^{-1} (j.K + k + base)]_5$
$= [3u - 3.30]_5 = (3u)_5$
$\phi(j,k,u) = [j \cdot K + K + base + rdx] \div N$
$= [30 + 2(3u)_5] \div 4$
$T(p) = [j \cdot K + k + base + rd.p]_5$
$= [30 + 2.p]_5 = [2.p]_5$

| Memory Number | Memory Address | Memory Matrix Contents | Processor Number | Memory Alignment | Processor Aligned Contents |
|---|---|---|---|---|---|
| u | $\phi(j,k,u)$ | | P | T(p) | |
| 0 | 7 | 3,0 | 0 | 0 | 3,0 |
| 1 | 9 | 3,6 | 1 | 2 | 3,2 |
| 2 | 8 | 3,2 | 2 | 4 | 3,4 |
| 3 | 9 | 4,1 | 3 | 1 | 3,6 |
| 4 | 8 | 3,4 | | | |

Again, the desired elements are accessed from memory 17 and are aligned properly. Note that from memory M3 the (4,1) element which is not part of the desired vector, is fetched but that the alignment network 21 does not produce a tag T(p) equal to 3 hence eliminating that element.

EXAMPLE 3:

Desired M vector = forward diagonal starting element (2,2).
Increment = 2
$K = 7, j = 2, k = 2, r = 2$, base = 9
$d = K + 1$
$= 8$ for forward diagonal
∴ $rd = 2.8 = 16$, $(rd)^{-1} = 1$, ∴ $(rd) \cdot (rd)^{-1} = 16.1_5 = 1$
$j \cdot K + k + base = 2.7 + 2 + 9 = 25$
$x = [(rd)^{-1}u - (rd)^{-1}(j, K + k + base)]_5$
$\phantom{x} = [1.u - 1.25]_5 = [u]_5$
$\phi(j,k,u) = [25 + 16 \cdot (u)_5] \div 4$
$T(p) = [25 + 16 \, p]_5 = [p]_5$

| Memory Number | Memory Address | Memory Matrix Contents | Processor Number | Memory Alignment | Processor Aligned Contents |
|---|---|---|---|---|---|
| u | φ(i,j,u) | | P | T(p) | |
| 0 | 6 | 2,2 | 0 | 0 | 2,2 |
| 1 | 10 | 4,4 | 1 | 1 | 4,4 |
| 2 | 14 | 6,6 | 2 | 2 | 6,6 |
| 3 | 18 | ... | 3 | 3 | — |
| 4 | 22 | ... | | | |

Again observe that correct elements are fetched out and aligned.

The hardware implementation of the above-described stored system for a two-dimensional matrix is relatively simple and is accomplished with standard digital computing hardware, see FIG. 6. A number of storage elements are provided which herein will be referred to as registers but which in other embodiments may be implemented otherwise, such as memories. The $u$ register 29 stores the binary value of the number of the memory 17 which is being utilized in the calculation of $\phi(j,k,u)$. Thus the $u$ register 29 is incrementable or otherwise changable to store selectively values of $u$ ranging from zero to the maximum number of memories 17 used in a particular application. The $j$ register 31 and the $k$ register 33 store the starting element of the M vector desired to be accessed. Thus, both the $j$ register 31 and the $k$ register 33 must likewise be incrementable or otherwise variable. The K register 35 stores the length of the row of a matrix being accessed. This register remains unchanged during the complete accessing of any given matrix. Again, the K register 35 must be changable to accommodate matrices of varying length rows. The base register 37 stores a binary representation of the value of the base or starting address of the matrix to be accessed. The base register 37 is of size sufficient to represent essentially all of the addresses in any given memory 17. Thus the size of the base register 37 is dependent upon the address size of the memory 17 and the number of memories 17 used in a given system. The base value stored in the base register 37 remains constant throughout the access of any given matrix. The $p$ register 39 stores the binary representation of the number of the particular processor 19 used in the calculation of the value T(p). Thus the $p$ register 39 is of size sufficient to store the binary representation of the largest number of processors 19 used in a given application. The value stored in $p$ register 39 is changed for each new calculation of the value T(p). The $r$ register 41 stores the binary representation of the value of the desired increment of elements along a given M vector. Thus, in a given application, the size of the $r$ register 41 is dependent upon the largest increment desired to be used in a given calculation. Most commonly, the increment value $r$ is chosen to be unity. Finally, the $d$ register 43 stores the binary representation of the value $d$ which is equal to the distance between two consecutive elements of a M vector. For example, $d$ is equal to one for a row, K for a column, K +1 for a forward diagonal, and K −1 for a reverse diagonal. The $d$ register 43 must be incrementable or otherwise changable for the purpose of accessing various M vectors.

The value stored in the $j$ register 31 and the K register 35 are combined in multiplier 45. Multiplier 45 is a standard binary multiplier or plurality thereof such as a plurality of Motorola MC1083 multipliers. The number of standard multipliers to be paralleled depend upon the binary length of the values stored in the $j$ register 31 and the K register 35. Likewise, the values stored in the $r$ register 41 and the $d$ register 43 are combined in multiplier 47 which is similar in construction to the multiplier 45. Multiplier 49 combines the output of multiplier 47 with the value stored in the $p$ register 39. A conventional binary adder 51 is used to combine the output of the $k$ register 33 and the base register 37. A second binary adder 53 is used to combine the output of the adder 51 and the multiplier 45. The output of the second adder 53 is combined with the output of multiplier 49 in a third adder 55.

The output of adder 55 is provided to the input 57 of a binary to modulo M translator 59 whose output 61 is T(p). The binary to modulo M translator 59 is preferably of the type described in copending patent application Ser. No. 576,002, filed May 9, 1975, in the name of Chandra Vora and assigned to the assignee of the present invention. The binary to modulo M translator 59 provides a modulo M output 61 of the binary input 57 where M is equal to the number of memories 27 in a particular application. Thus, for example, in the system of FIG. 2, M is equal to 67 and in the system of FIG. 3, M is equal to 5. The circuitry thus far described concluding with the modulo M translator 59 generates the tag $T_{(p)}$.

The output of adder 53 is subtracted from the value stored in the u register 29 in standard binary subtractor 63. The output of multiplier 47 addresses a ROM 65. The ROM 65 is preprogrammed to output the modulo M value of its input raised to the −1 power. Suitable read-only memories for ROM 65 are described in the above-mentioned binary to modulo M translation patent application Ser. No. 576,002. The output 67 of ROM 65 is combined with the output of standard subtractor 63 in a third multiplier 69 which is similar in construction and operation to the above-described multiplier 45. The output of multiplier 69 is fed to a second modulo M translator 71 which is identical in function and nature to the above-described modulo M translator 59. The output of modulo M translator 71 is combined in multiplier 73 with the output of multiplier 47. The output of multiplier 73 is summed with the output of adder 53 in adder 75.

The output of adder 75 is fed to the input 77 of a divide-by-N circuit 81 wherein N equals the number of processors 19 used in a particular embodiment. For example, in the system embodiment of FIG. 2, N is equal to 16 and in the system embodiment shown in FIG. 3, N is equal to 4. Since N is always equal to a binary number, the divide-by-N circuit 81 is simply a shift register, or in an other embodiment, a mask generator circuit. The output 83 of the divide-by-N circuit 81 is the tag $\phi(i,j,u)$.

Thus, the generation of tags T(p) and $\phi(i,j,u)$ is accomplished by standard binary hardware with the addition of the modulo M translators 59 and 71 which are in the preferred embodiment constructed in accord with the teachings of the above-mentioned patent application Ser. No. 576,002.

The extension of the present invention from a two dimensional matrix system to a three dimensional system follows a simple logical progression. In a three dimensional array, the two primary storage indexing equations are:

1. a. $\phi(i,j,k,u) = [JK \cdot i + Kj + k + base + rd \cdot x] \div N$ b. $x = [(rd)^{-1}u - (rd)^{-1}(JK \cdot i + Kj + k + base)] \bmod M$ 2. $u = T(p) = [JK \cdot i + Kj + k + base + rd \cdot p] \bmod M$ where
$i,j,k$ = starting element of M vector
$I,J,K$ = dimension of array
base = array mapping starting address
$r$ = increment
$d$ = distance between two consecutive elements of a M-vector
$N$ = the number representing the greatest power of two less than M
$T(p)$ = memory tag for processor P
$rd \neq$ a multiple of M Consider a three dimensional matrix of dimension 7 × 7 × 7 as shown in generalized form in FIG. 7. Such a matrix is mapped into a five memory system (see FIG. 2) of the present invention in the manner shown in FIG. 8.

| EXAMPLE OF THREE-DIMENSIONAL ALIGNMENT | | | | | |
|---|---|---|---|---|---|
| Desired M vector = vector with elements 011, 021, 031, and 041. | | | | | |
| Increment = 1; base = 4; I = J = K = 7 (dimension of array). | | | | | |
| Calculation: | | | | | |
| J.K = 7.7 = 49 | | | | | |
| K = 7 | | | | | |
| i = 0; j = 1; k = 1 | | | | | |
| r = 1; d = k = 7; rd = 7; (rd)$^{-1}$ = 3 | | | | | |
| Memory Number | Memory Address | Memory Matrix Contents | Processor Number | Memory Alignment | Processor Aligned Contents |
| u | $\phi(u)$ | | P | T(p) | |
| 0 | 10 | 051 | 0 | 2 | 011 |
| 1 | 6 | 031 | 1 | 4 | 021 |
| 2 | 3 | 011 | 2 | 1 | 031 |
| 3 | 8 | 041 | 3 | 3 | 041 |
| 4 | 4 | 021 | — | — | — |

Figure 9:
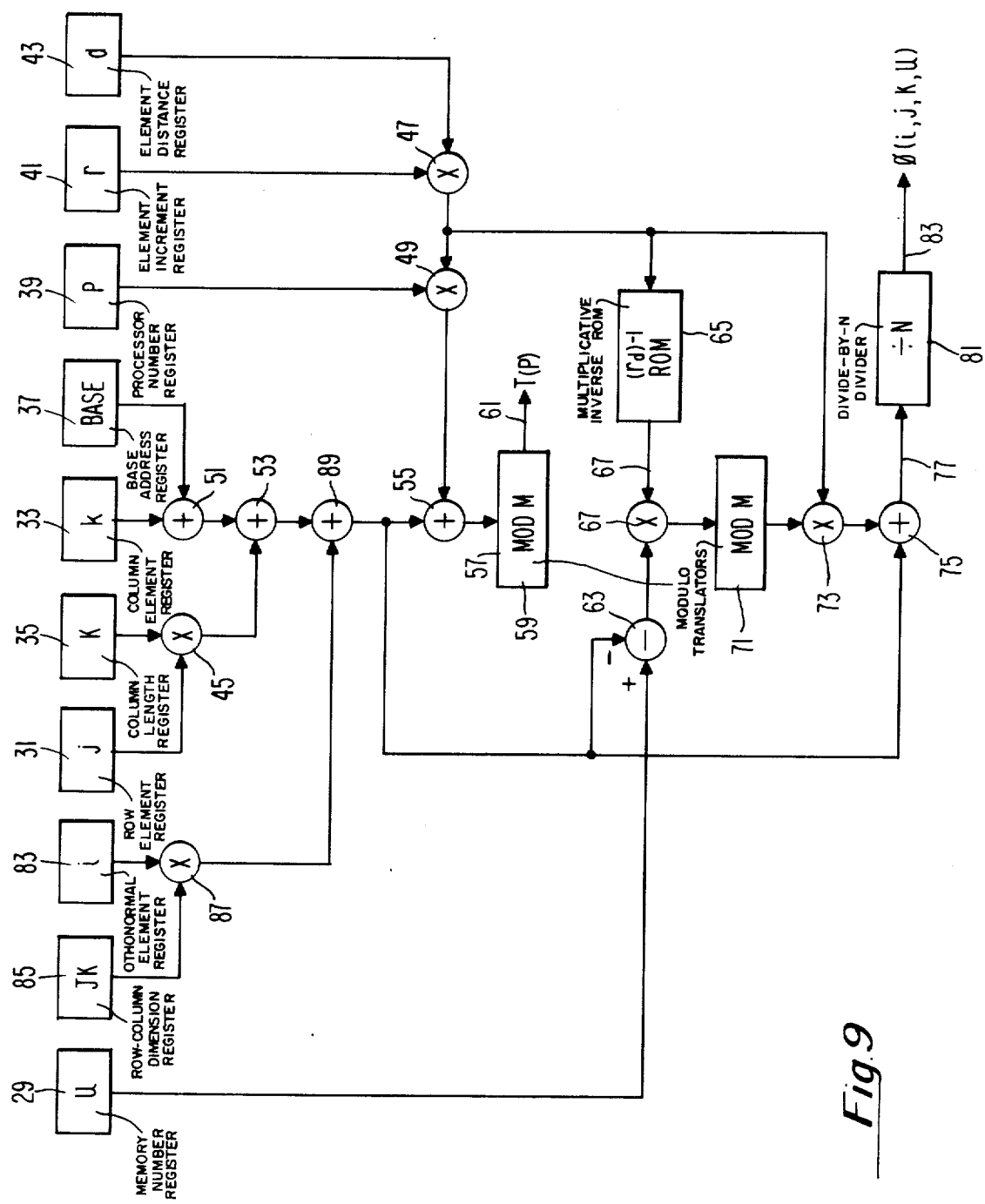
FIG. 9 is a diagram of a hardware implementation for generating two indexing tags used to access the stored matrix of FIG. 7.

The hardware implementation for a system realizing the above-described non-conflicting three dimensional matrix storing and accessing system is shown in FIG. 9. By comparison with the two-dimensional system above-described and shown in FIG. 6, it can be seen that only four hardware elements are added to the two dimensional system shown in FIG. 6 to achieve the three dimensional system portrayed in FIG. 9. Thus only the four additional elements will be described herein. An $i$ register 83 stores in binary form the beginning $i$ location of the starting element of an M vector to be accessed. It is understood that the $i$ register 83 must be incrementable or otherwise changable to adjust to various starting element locations. A JK register 85 stores the value of the J × K size of the three dimensional matrix. In the example discussed above, both J and K equal 7; therefore the value stored in the JK register is for that example 49.

The outputs of the $i$ register 83 and the JK register 85 are summed in multiplier 87 which is in operation and function identical to the above-described multiplier 45. The output of multiplier 87 is combined in adder 89 with the output of adder 53. Adder 89 is identical in structure and function to the above-described adders 51, 53, and 75.

The remaining portion of the hardware implementation for a three dimensional matrix storage system based upon the present invention shown in FIG. 9 is identical to that shown in FIG. 6 for a two dimensional storage system. Thus, for a three dimensional matrix as for a two dimensional matrix the indexing tags T(p) and $\phi(u)$ are realized through standard hardware elements and the addition of two modulo M translators 59 and 71 which are implemented as described in the above-mentioned patent application Ser. No. 576,002.

In higher dimensional arrays, the hardware implementation can be realized following the same logical progression shown in the extension of the two dimensional array of FIG. 6 to the three dimensional array of FIG. 9. Further, higher dimensional arrays can be handled by existing hardware provided that some of the dimensions are held constant. Thus the present invention as shown in the preferred embodiments for two and three dimensional arrays can be extended by logical progression to handle even higher dimensional arrays.

Although particular embodiments, examples, and hardware implementations of the present invention have been described and shown, it is understood that many modifications may be made by those skilled in the art without departing from the scope of the invention particularly shown and described herein. As examples, the output of the $r$ register 41 and $d$ register 43 of FIGS. 6 and 9 may be summed together in a modulo M ROM prior to being inputted to multiplier 49, ROM 65 and multiplier 73. Such an additional modulo M ROM would result in the processing of a fewer number of parallel bits. This technique of decreasing the number of parallel bits by using modulo M ROMs may be incorporated wherever practical in a given application. Further, various permutations of multiplication and addition may be made while achieving the same results of arriving at indexing tags T(p) and $\phi(i,j,k,u)$.

Also, in certain applications, it may be found desirable to duplicate the alignment network 15 in such a fashion as to develop a first (pull) alignment network for pulling matrix elements from the plurality of memories 17 into the plurality of processors 19 for processing and a second (push) alignment network for pushing matrix elements from the plurality of processors 19 back into the plurality of memories 17. Such a pull-push alignment network configuration would ease design considerations on the network due to the unidirectional data flow therethrough and would provide in general a smooth circular data flow operation howbeit at the cost of additional hardware. Thus, while the invention has been particularly shown and described with reference to a preferred embodiment thereof, it will be understood by those skilled in the art that various changes in form and details may be made therein.

What is claimed is:

1. A parallel data processing storage and accessing system comprising:
   a plurality of memory modules for storing a matrix and for providing non-conflicting access to matrix elements along all individual linear vectors thereof, each module in said plurality of memory modules having a plurality of addressable storing locations, each location therein capable of storing a single matrix element, the number of memory modules in said plurality thereof being relatively prime to the memory ordering of each linear vector of said matrix stored, wherein the memory ordering of each linear vector is equal to the distance between two consecutive elements therein times the increment to be accessed;
   a plurality of data processing units, each unit therein for performing data processing operations on matrix elements;
   alignment means interposing said plurality of memory modules and said plurality of data processing units for providing data communications paths between designated individual data processing units from said plurality thereof and designated individual memory modules from said plurality thereof;
   tag generating means cooperating with said alignment means and said plurality of memory modules for designating individual data processing units from said plurality thereof and individual memory modules from said plurality thereof for data communications therebetween and for addressing each memory module in said plurality thereof whereby matrix elements along all individual linear vectors of said matrix stored are non-conflictingly accessible.

2. The parallel data processing storage and accessing system according to claim 1 wherein: the number of processing units in said plurality of data processing units is a power of two.

3. The parallel data processing storage and accessing system according to claim 2 wherein:
   said number of modules in said plurality of memory modules is a prime number.

4. The parallel data processing storage and accessing system according to claim 2 wherein said alignment means includes:
   a plurality of multiplexer means, an individual multiplexer means therein associated with each individual processing unit in said plurality of processing units, said individual multiplexer means for providing a data communications path between its associated individual processing unit and a designated memory module in said plurality of memory modules.

5. The parallel data processing storage and accessing system according to claim 1 wherein:
   each module in said plurality of memory modules is a random access memory module.

6. The parallel data processing storage and accessing system according to claim 1 wherein said tag generating means includes:
   module tag generating means for generating a plurality of module tags, each module tag in said plurality thereof being associated with an individual data processing unit in said plurality thereof for designating an individual module in said plurality of memory modules for data communications therebetween; and
   address tag generating means for generating a plurality of memory addressing tags, an individual memory addressing tag for each module in said plurality of memory modules.

* * * * *